US006893079B1

(12) United States Patent
Johnson et al.

(10) Patent No.: US 6,893,079 B1
(45) Date of Patent: May 17, 2005

(54) MOTOR VEHICLE BODY WITH SIDE IMPACT PROTECTION

(75) Inventors: Nancy L. Johnson, Northville, MI (US); Alan L. Browne, Grosse Pointe, MI (US); Gary L. Jones, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/739,609

(22) Filed: Dec. 18, 2003

(51) Int. Cl.[7] .............................................. B60R 19/42
(52) U.S. Cl. ................. 296/187.12; 293/114; 293/128; 296/187.03
(58) Field of Search ....................... 296/187.03, 187.09, 296/187.12, 187.13; 293/114, 118, 126, 128

(56) References Cited

U.S. PATENT DOCUMENTS

| | | | | |
|---|---|---|---|---|
| 2,512,527 | A | * | 6/1950 | Hoffman ..................... 293/118 |
| 3,718,357 | A | * | 2/1973 | Hertzell ........................ 293/9 |
| 4,221,410 | A | * | 9/1980 | Dawson ........................ 293/21 |
| 4,437,697 | A | * | 3/1984 | Hinojos ...................... 293/118 |
| 4,518,183 | A | * | 5/1985 | Lee ............................ 293/118 |
| 4,601,367 | A | * | 7/1986 | Bongers ..................... 188/377 |
| 4,648,644 | A | * | 3/1987 | Swanson et al. ............ 293/118 |
| 5,101,927 | A | * | 4/1992 | Murtuza ..................... 180/275 |
| 5,620,219 | A | * | 4/1997 | Servant ...................... 293/117 |
| 6,220,652 | B1 | | 4/2001 | Browne et al. ............. 296/188 |
| 6,224,120 | B1 | * | 5/2001 | Eipper et al. ............... 293/118 |

FOREIGN PATENT DOCUMENTS

| JP | 02133262 A | * | 5/1990 |
|---|---|---|---|
| JP | 02225153 A | * | 9/1990 |

* cited by examiner

*Primary Examiner*—D. Glenn Dayoan
*Assistant Examiner*—Paul Chenevert
(74) *Attorney, Agent, or Firm*—Kathryn A. Marra

(57) ABSTRACT

A side impact protection system for a motor vehicle body having a stowed position and a deployed position, the system includes a first L-shaped rigid structure comprising a first portion and a second portion; a second L-shaped rigid structure comprising a first portion and a second portion; a synthetic cable fixedly attached to the second portions of the first and second L-shaped rigid structures, wherein the synthetic cable is made from a plurality of helically braided bundles of fibers selected from a group consisting of aramid fibers and liquid crystal polymer fibers characterized by strain-at-failure exceeding about 3 percent; and a deployment device in operative communication with the first portions of the first and second L-shaped rigid structures to selectively extend the first portion outwardly from the deployment device, and wherein in a stowed position the second portions are at about the same plane and in a deployed position the second portions are parallel and the synthetic cables form a web-like structure. Processes for suppressing intrusion into a passenger compartment of a motor vehicle body by an object laterally impacting the vehicle body are also described.

16 Claims, 4 Drawing Sheets

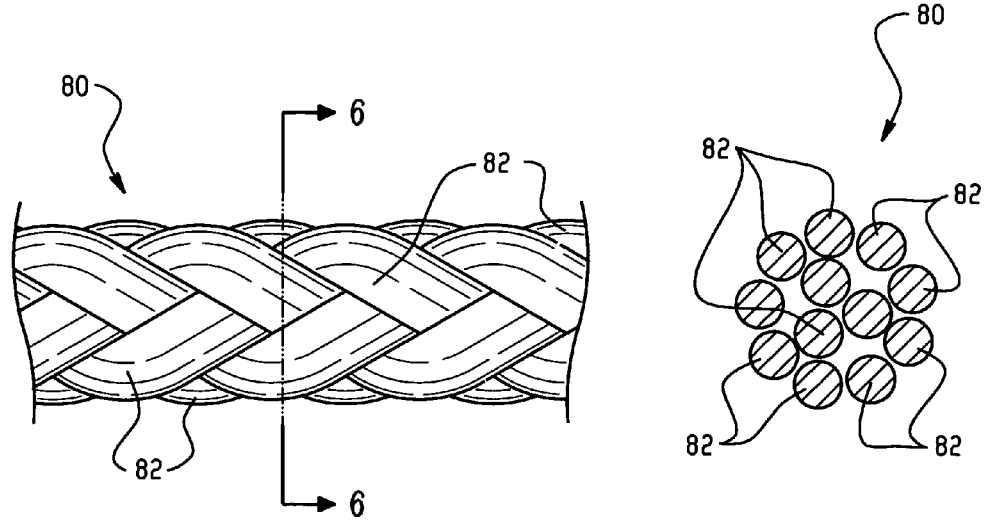
Fig. 5
Fig. 6
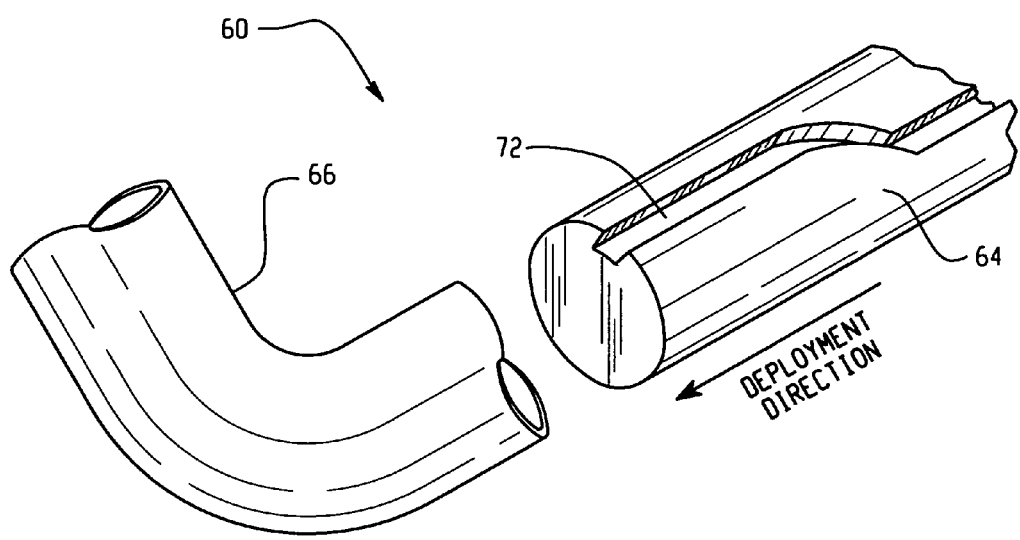
Fig. 7

MOTOR VEHICLE BODY WITH SIDE IMPACT PROTECTION

BACKGROUND

This disclosure relates to a motor vehicle body having side impact protection.

A motor vehicle body typically includes a plurality of vertical pillars between which are defined a plurality of door frames for access to a passenger compartment of the vehicle body. Respective ones of a plurality of doors are supported by hinges on the front vertical pillar of each door frame for pivotal movement between closed positions and open positions. Each door further commonly includes a horizontal steel door beam which spans the corresponding door frame in the closed position of the door and affords side impact protection against intrusion into the passenger compartment of an object, e.g. another motor vehicle, which impacts the vehicle body laterally. Increasing the structural integrity of the door beam by, for example, increasing the gauge of the steel used to make the beam, increases the rigidity of the door beam and its side impact protection but also increases the weight of the motor vehicle, which negatively affects fuel economy. Motor vehicle bodies having stiff, light weight door beams made of fiber reinforced composite materials have been proposed but have not been commercially successful because such composite beams exhibit low strain-at-failure, i.e., fail abruptly after only minimal strain. Motor vehicle bodies having metal cables for side impact protection have also been proposed but such cables are also characterized by low strain at failure.

Accordingly, there remains a need for a motor vehicle body having a light weight side impact protection barrier characterized by high elongational stiffness and high strain-at-failure.

BRIEF SUMMARY

Disclosed herein is a motor vehicle body, comprising a side impact protection system for a motor vehicle having a stowed position and a deployed position, comprising a first L-shaped rigid structure disposed in a front rocker region and a second L-shaped rigid structure disposed in a rear rocker region, wherein each one of the L-shaped rigid structures comprises a first portion and a second portion that is perpendicularly oriented with respect to the first portion, wherein the stowed position has the second portions of the first and second L-shaped rigid structures lying in the same plane, and wherein in the deployed position the second portions of the first and second L-shaped rigid structures are parallel; a synthetic cable fixedly attached to the second portions of the L-shaped rigid structures, wherein the synthetic cable is made from a plurality of helically braided bundles of fibers selected from a group consisting of aramid fibers and liquid crystal polymer fibers characterized by strain-at-failure exceeding about 3 percent; and a deployment device in operative communication with the first portions so as to selectively project the first portion away from the side of the vehicle, and wherein the second portion is in rotating engagement with the first portion such that the second portion rotates after the first portion is projected away from the vehicle to form a web-like structure from the synthetic cable about an exterior of the motor vehicle body.

A side impact protection system comprises for a motor vehicle body having a stowed position and a deployed position, the system comprising a first L-shaped rigid structure comprising a first portion and a second portion; a second L-shaped rigid structure comprising a first portion and a second portion; a synthetic cable fixedly attached to the second portions of the first and second L-shaped rigid structures, wherein the synthetic cable is made from a plurality of helically braided bundles of fibers selected from a group consisting of aramid fibers and liquid crystal polymer fibers characterized by strain-at-failure exceeding about 3 percent; and a deployment device in operative communication with the first portions of the first and second L-shaped rigid structures to selectively extend the first portion outwardly from the deployment device, and wherein in a stowed position the second portions are at about the same plane and in a deployed position the second portions are parallel to one another, perpendicularly oriented relative to ground, and the synthetic cables attached to the second portions form a web-like structure.

A process for suppressing intrusion into an passenger compartment of a motor vehicle body by an object laterally impacting the vehicle body, comprising: deploying a side impact protection system comprising a first L-shaped rigid structure comprising a first portion and a second portion; a second L-shaped rigid structure comprising a first portion and a second portion; and a synthetic cable fixedly attached to the second portions of the first and second L-shaped rigid structures, wherein the synthetic cable is made from a plurality of helically braided bundles of fibers selected from a group consisting of aramid fibers and liquid crystal polymer fibers characterized by a strain-at-failure exceeding about 3 percent, wherein deploying the side impact protection system comprises outwardly projecting the first portions of the first and second L-shaped rigid structures away from the vehicle body and subsequently rotating the second portions of the L-shaped rigid structures from lying in a similar plane to an upright position substantially parallel to one another, wherein the synthetic cable forms a web like structure when the second portions are in the upright position.

The above described and other features are exemplified by the following figures and detailed description.

BRIEF DESCRIPTION OF THE DRAWINGS

Referring now to the figures, which are exemplary embodiments and wherein the like elements are numbered alike:

FIG. 5 is an enlarged view of a cable employed in the side impact protection system;

FIG. 6 is a sectional view taken along the line 6—6 of FIG. 5 illustrating the cable employed in the side impact protection system; and FIG. 7 is a perspective view of a first portion for an exemplary L-shaped rigid structure for use in the side impact protection system.

DETAILED DESCRIPTION

The present disclosure is generally directed to a side impact protection system that can be selectively deployed to provide side impact protection to a vehicle body. Upon deployment, the system outwardly expands and forms a web-like structure of cable spaced apart from and about a selected exterior side surface of the vehicle. In this manner, side impact protection to a vehicle interior region can be enhanced by the web-like structure such as may be desired in response to an imminent side impact event to the motor vehicle.

Figure 1:
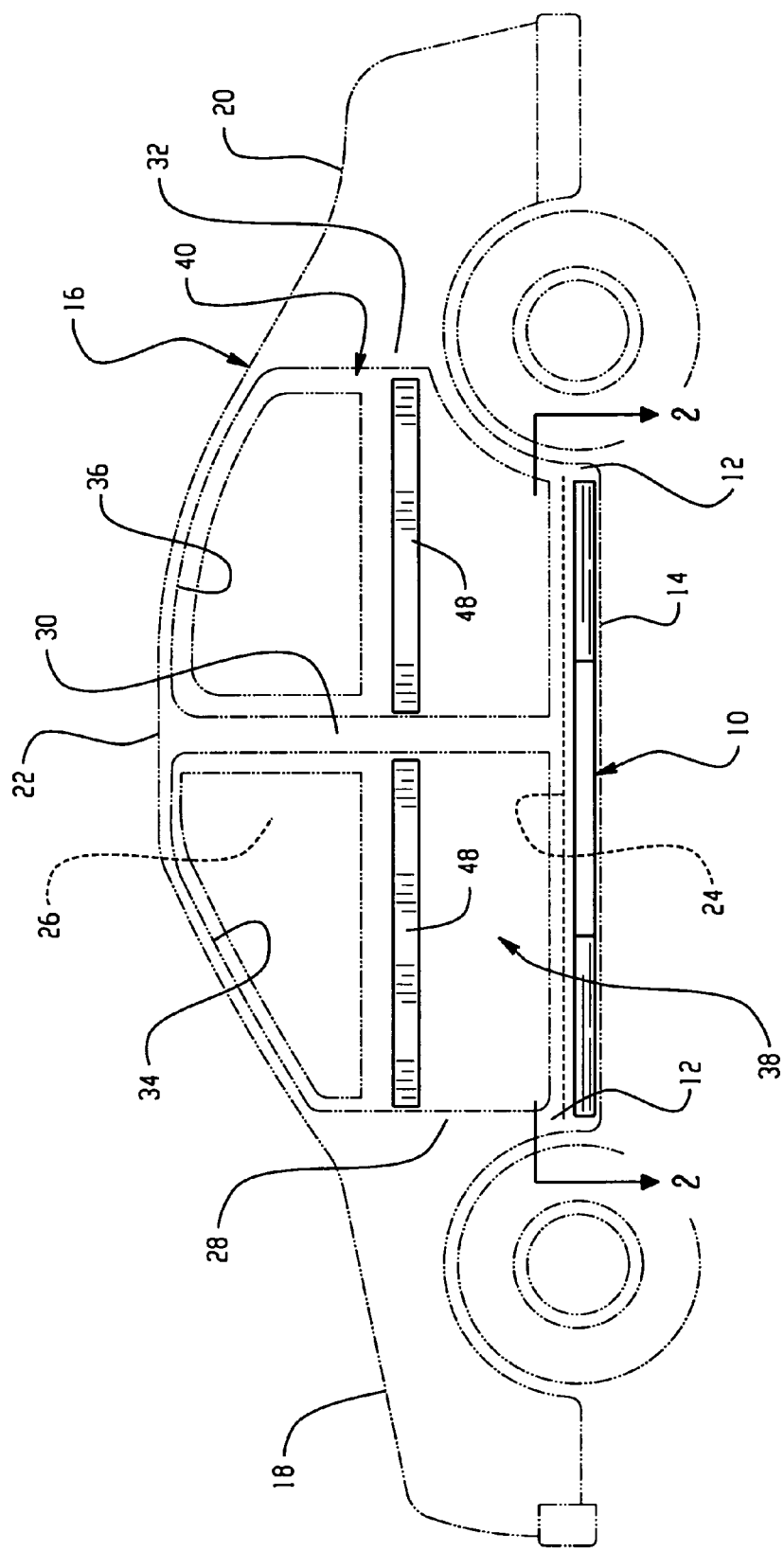
FIG. 1 is a schematic elevation view of a motor vehicle body including a side impact protection system.
Figure 2:
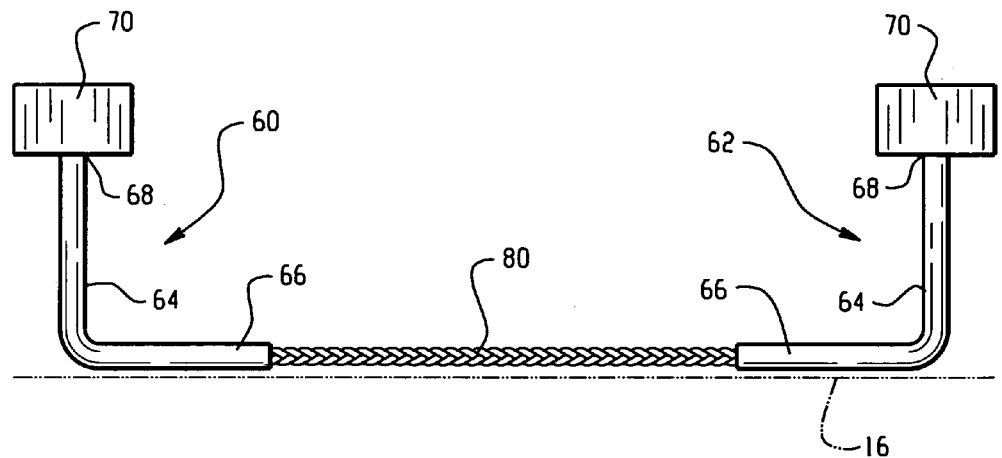
FIG. 2 is a sectional view taken along the line 2—2 of FIG. 1 illustrating the side impact protection system in a stowed position.

Referring now to FIGS. 1 and 2, there is shown an exemplary side impact protection system, generally designated by reference numeral 10, for use in a motor vehicle body 16. The side impact protection system 10 is preferably disposed in rocker regions 12 at about a floorpan 14 (see FIGS. 2, 3) of the motor vehicle body 16.

The motor vehicle body 16 generally includes a front sheet metal portion 18, a rear sheet metal portion 20, a roof 22, and a floor 24 which cooperate in defining therebetween an interior compartment 26 of the vehicle body 16. The vehicle body 16 further includes on opposite lateral sides thereof a first pair of vertical pillars 28 referred to as "A" pillars at the front of the passenger compartment, a second pair of vertical pillars 30 referred to as "B" pillars in the middle of the passenger compartment, and (present if a four door vehicle) a third pair of vertical pillars 32 referred to as "C" pillars behind the passenger compartment. The A and B-pillars 28, 30, define vertical front and rear edges, respectively, of respective ones of a pair of front door frames 34 on opposite sides of the vehicle body for access to the passenger compartment. The B- and C-pillars 30, 32 define vertical front and rear edges, respectively, of respective ones of a pair of rear door frames 36 on opposite sides of the vehicle body for access to the passenger compartment. The floorpan 14 with various crossbeam structural members generally spans longitudinally with respect to the vehicle from about the A-pillar 28 to about the C-pillar 32 and laterally across the vehicle from rocker region to rocker, and as such, may form part of the vehicle chassis.

The vehicle body 16 further includes a pair of front doors 38 and optionally, a pair of rear doors 40 depending on the design of the vehicle body. Each front door 38 includes a dish-shaped inner panel and an outer panel attached, for example, by hem flanging to the inner panel and cooperating therewith in defining an inner chamber of the door (not shown). Each rear door 40 also includes a dish-shaped inner panel and an outer panel attached to the inner panel and cooperating therewith in defining an inner chamber of the door (not shown). Each of the front and rear doors 38,40 further includes a schematically represented horizontal steel beam 48 in the corresponding inner chamber of the door.

Figure 3:
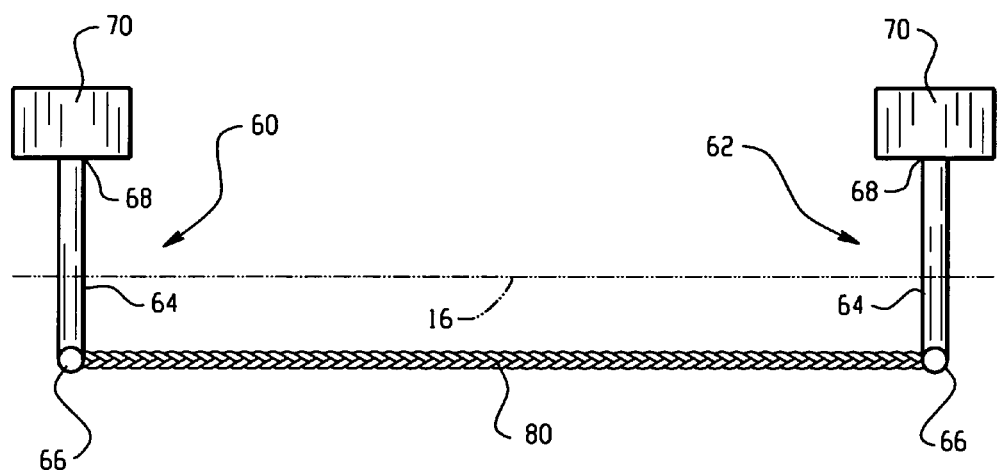
FIG. 3 is a sectional view taken along the line 2—2 of FIG. 1 illustrating the side impact protection system in a deployed position.

The side impact protection system 10 is designed as a stand alone impact barrier system or as an additive protection system that can be used in combination with the horizontal steel beams 48 and/or any other side impact protection means. As shown more clearly in FIGS. 2–3, the side impact protection system 10 generally includes two L-shaped rigid structures 60, 62, each including a first straight portion 64 perpendicularly oriented with respect to a second straight portion 66. An end 68 for each first straight portion 64 is attached to the cross bar beam at about a rocker locations 12, and more particularly, is attached to a deployment device 70. The deployment device 70 is fixedly attached variously within the rocker/floorpan/cross-car beam location 12 for deploying the system 10 as will be described in greater detail below. When in the stowed position as shown in FIGS. 1 and 2, both second portions 66 of the two L-shaped rigid structures 60, 62 are preferably laterally oriented at a first position that is at about the same plane to one another. During deployment, the first portions 64 simultaneously extend outwardly from the vehicle body 16 and the second portions 66 are moved to a second position resulting in a substantially upright position, i.e., the second portions 66 move from lying in the same substantially horizontal plane to being substantially parallel to one another in substantially the vertically direction, as shown in FIG. 3.

Figure 4:
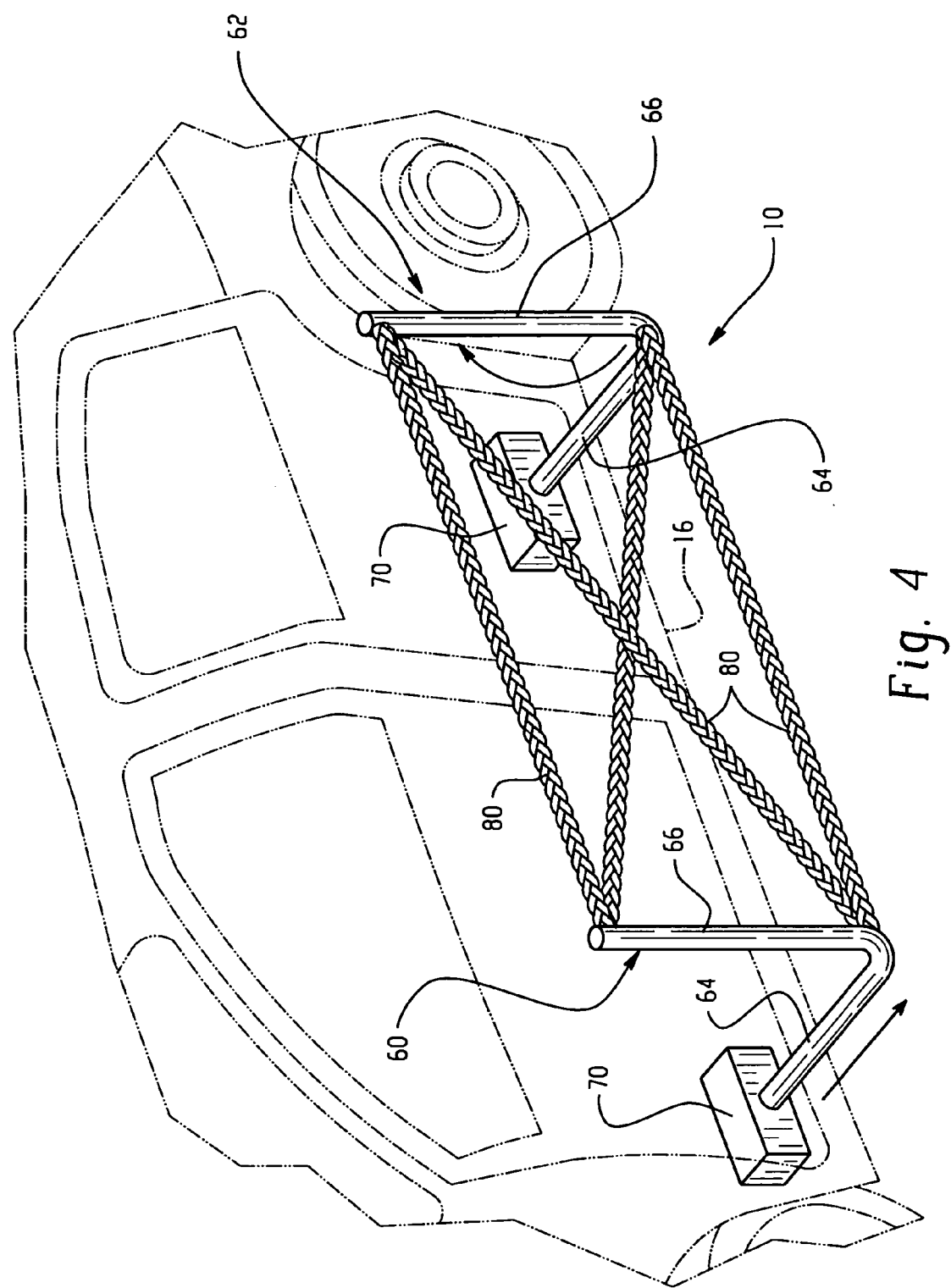
FIG. 4 is a perspective view of the side impact protection system in the deployed position.

A plurality of synthetic cables 80 is fixedly attached to the second portions 66. Upon deployment of system 10, the synthetic cables 80 become substantially taut upon rotation of the second portions 66 to the upright position so as to form an X pattern in the vertical plane parallel to the side of the vehicle as shown in FIG. 4. In this manner, when the system 10 is deployed, the synthetic cables 80 act to reduce intrusion into the interior region 22 of the vehicle body 16 as a result of a side impact event or the like. Moreover, by being deployed in the X pattern as shown, the cables can engage, for example, a bumper of a striking vehicle independent of its vertical location. Although an X pattern is shown, a variety of patterns can be employed and is well within the skill of those in the art to optimize the cable arrangement to suit the particular application.

Any mechanical, pyrotechnical or pneumatic means can be employed for simultaneously extending the first portions 64 outwardly from the vehicle body 16 and for causing rotation of the second portion 66 as described. For example, as shown in FIG. 7, rotation of the second portion to the upright position can be effected with a slot-type guide having an initial non-threaded portion at an end of the second portion for engagement with the first portion 64. The housing for the slot type guide or the car structure itself would include a pin for sliding engagement with the slot 72. A mechanical locking mechanism such as a ratchet type device would hold the first portion 64 in this position and prevent further rotation until deactivated. In this manner, the first portion 64 first moves outwardly away from the vehicle body 16 prior to rotation of the second portion to an upright position such that upon rotation of the second portions 66, clearance from the exterior of the vehicle body 16 occurs.

Alternatively, a screw type guide having an initial non-threaded portion for extending the L-shaped rigid structure 60 or 62 away from the vehicle body and a threaded portion extending from the initial portion for rotating the second portion 66 to the upright position. A plunger or the like can be employed for effecting extension and translation of the L-shaped rigid structure. The screw type guide would include a stop mechanism so as to lock the L-shaped rigid structure 60 or 62 in place once deployed such that the second portion 66 is locked at an angle of about 90 degrees relative to ground.

The synthetic cables 80 are preferably made of filaments of a synthetic material exhibiting high elongational stiffness and high strain-at-failure. Such cables provide non-catastrophic failure modes at very high strains as compared to the low strain catastrophic failure mode of cables formed of steel. Suitable synthetic materials are selected from a group consisting of Kevlar 29 aramid fibers available from the Dupont Corporation and a high performance thermoplastic multi-filament yarn spun from Vectrae®, a liquid crystal polymer available from the Hoechst Celanese Corporation. Kevlar 29 and Vectrae® are materials having densities of about 1.4 g/cc and are light weight relative to steel having a density of about 7.7 g/cc. Kevlar 29 ® and Vectra® also exhibit high strain-at-failure, i.e., 3.6% and 3.3%, respectively, relative to the stain-at-failure for steel wire, i.e., 1.1%. As shown in FIGS. 5 and 6, each synthetic cable 80 is comprised of filaments that are preferably grouped into a plurality of multi-filament bundles 82, which bundles are helically braided. Synthetic cables, which performed satisfactorily in experimental tests, consisted of 12 multi-filament bundles, each cable having a diameter of about 1.27 cm.

The deployment device functions to cooperatively and simultaneously laterally extend the first portions of the L-shaped rigid structures 60, 62 from the vehicle body. Once clearance from the doors panels is achieved, the second portions rotate to the second position, i.e., upright position. The deployment device can be any means to effect movement of the L-shaped rigid structures in the manner previously described. Suitable deployment devices include, but are not intended to be limited to, motors, hydraulics, pneumatics, pyrotechnics, and the like. Pyrotechnics are preferred for rapid release systems, wherein reversibility may not be desired. For reversible systems, the use of motors, hydraulics, pneumatics, and like devices are preferred.

In a preferred embodiment, the deployment device is in operative communication with a pre-crash sensor. In this manner, a signal from the sensor can be used to trigger the deployment device upon an imminent impact event. It should be noted that the system can be configured such that deployment need only occur on the side of the vehicle body 16 sensing the impact. Alternatively, deployment need only occur if an occupant is in a proximate seating location to the side of the vehicle body 16 sensing the impact.

Immediately prior to an impact event, the side impact protection system deploys to form the web-like structure of cables 80. Upon impact, the synthetic cables 80 become extremely stiff in tension and transfer the impact forces to the A-, B-, and C-pillars as well as to the car cross beams connected to the floorpan 14 and vehicle chassis, which impact forces accelerate the vehicle body away from the impact and thereby suppress penetration into the passenger compartment 26 of the object impacting the vehicle body. Depending on the magnitude of the impact force, further suppression of penetration can occur by the horizontal beams 48 laterally disposed in the doors 38,40. Thus, the horizontal beams 48 supplement the side impact protection afforded by the side impact protection system 10; it is within the scope of this invention to eliminate the horizontal beams 48.

Importantly, the effective high strain-at-failure capability of the synthetic cables 80 of about 13%, attributable to about 3% elongation of the individual synthetic fibers and about 10% elongation attributable to the helical braid of the bundles 82, permits each synthetic cable to elongate inelastically without failure while resisting penetration into the passenger compartment in accordance with pertinent, legislatively mandated standards. An additional important performance characteristic of the synthetic cables 80 is that they do not fail abruptly in tension, as does a steel cable. Rather, individual ones of the fibers in respective ones of the braided bundles 82 rupture serially or sequentially so that while some of the braided bundles may fail in tension, others remain intact and capable of sustaining considerable tensile forces to continue to suppress lateral penetration into the passenger compartment. Also, when an individual bundle fails, the braid will loosen and the remaining braid bundles will shift location as load it transferred. This will cause the remaining intact bundles to align more closely with the longitudinal axis of the cable and increase the net strain that the cable exhibits at the time when the last bundle fails.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A motor vehicle body, comprising:
   a side impact protection system for a motor vehicle having a stowed position and a deployed position, comprising a first L-shaped rigid structure disposed in a front rocker region and a second L-shaped rigid structure disposed in a rear rocker region, wherein each one of the L-shaped rigid structures comprises a first portion and a second portion that is perpendicularly oriented with respect to the first portion, wherein the stowed position has the second portions of the first and second L-shaped rigid structures lying in the same plane, and wherein in the deployed position the second portions of the first and second L-shaped rigid structures are parallel;
   a synthetic cable fixedly attached to the second portions of the L-shaped rigid structures, wherein the synthetic cable is made from a plurality of helically braided bundles of fibers selected from a group consisting of aramid fibers and liquid crystal polymer fibers characterized by strain-at-failure exceeding about 3 percent; and
   a deployment device in operative communication with the first portions so as to selectively project the first portion away from the side of the vehicle, and wherein the second portion is in rotating engagement with the first portion such that the second portion rotates after the first portion is projected away from the vehicle to form a web-like structure from the synthetic cable about an exterior of a side of the motor vehicle body.

2. The motor vehicle body of claim 1, further comprising a horizontal beam in a door spanning a door frame and defining a second side impact protection barrier on the vehicle body for suppressing intrusion into a passenger compartment by an object laterally impacting the vehicle body.

3. The motor vehicle body of claim 1, wherein the web-like structure forms an X pattern.

4. The motor vehicle body of claim 1, further comprising a sensor in communication with the deployment device for communicating an imminent impact event to the deployment device.

5. The motor vehicle body of claim 1, wherein the deployment device is reversible.

6. The motor vehicle body of claim 1, wherein the deployment device is irreversible.

7. The motor vehicle body of claim 1, wherein the synthetic cables form a web-like structure that is spaced apart from a side of the motor vehicle body.

8. A side impact protection system for a motor vehicle body having a stowed position and a deployed position, the system comprising:

a first L-shaped rigid structure comprising a first portion and a second portion (66);

a second L-shaped rigid structure comprising a first portion and a second portion;

a synthetic cable fixedly attached to the second portions of the first and second L-shaped rigid structures, wherein the synthetic cable made from a plurality of helically braided bundles of fibers selected from a group consisting of aramid fibers and liquid crystal polymer fibers characterized by strain-at-failure exceeding about 3 percent; and a deployment device in operative communication with the first portions of the first and second L-shaped rigid structures to selectively extend the first portion outwardly from the deployment device, and wherein in a stowed position the second portions are at about the same plane and in a deployed position the second portions are parallel to one another, perpendicularly oriented relative to ground and the synthetic cables attached to the second portions form a web-like structure.

9. The side impact protection system of claim 8, wherein the web-like structure forms an X pattern.

10. The side impact protection system of claim 8, further comprising a sensor for communicating an imminent impact event to the deployment device.

11. The side impact protection system of claim 8, wherein the deployment device is reversible.

12. The side impact protection system of claim 8, wherein the deployment device is irreversible.

13. A process for suppressing intrusion into an passenger compartment of a motor vehicle body by an object laterally impacting the vehicle body, comprising:

deploying a side impact protection system, the system comprising a first L-shaped rigid structure comprising a first portion and a second portion; a second L-shaped rigid structure comprising a first portion and a second portion; and a synthetic cable fixedly attached to the second portions of the first and second L-shaped rigid structures, wherein the synthetic cable is made from a plurality of helically braided bundles of fibers selected from a group consisting of aramid fibers and liquid crystal polymer fibers characterized by a strain-at-failure exceeding about 3 percent;

outwardly projecting the first portions of the first and second L-shaped rigid structures away from the vehicle body; and subsequently rotating the second portions of the L-shaped rigid structures from lying in a similar plane to an upright position substantially parallel to one another, wherein the synthetic cable forms a web like structure when the second portions are in the upright position.

14. The process of claim 13, wherein the second portion of the first L-shaped rigid structure rotates in a clockwise direction to the upright position and the second portion of the second L-shaped rigid structure rotates in a counter clockwise position to the upright position.

15. The process of claim 13, wherein rotating the second portions of the first and second L-shaped rigid structure forms the web like structure into an X pattern.

16. The process of claim 13, wherein subsequently rotating the second portions of the L-shaped rigid structures forms the web like structure at a distance from a side exterior of the vehicle body.

* * * * *